Sept. 10, 1968　　　L. E. NICKLA ET AL　　　3,400,807
INTERMITTENTLY OPERATED BALE THROWER
Filed Oct. 19, 1966　　　　　　　　　　　　4 Sheets-Sheet 1

Inventors:
Louis E. Nickla
John R. Majkrzak
By Noel F. Artman
Atty.

Sept. 10, 1968     L. E. NICKLA ET AL     3,400,807

INTERMITTENTLY OPERATED BALE THROWER

Filed Oct. 19, 1966     4 Sheets-Sheet 2

Inventors:
Louis E. Nickla
John R. Majkrzak
By Neil G. Artman
Atty.

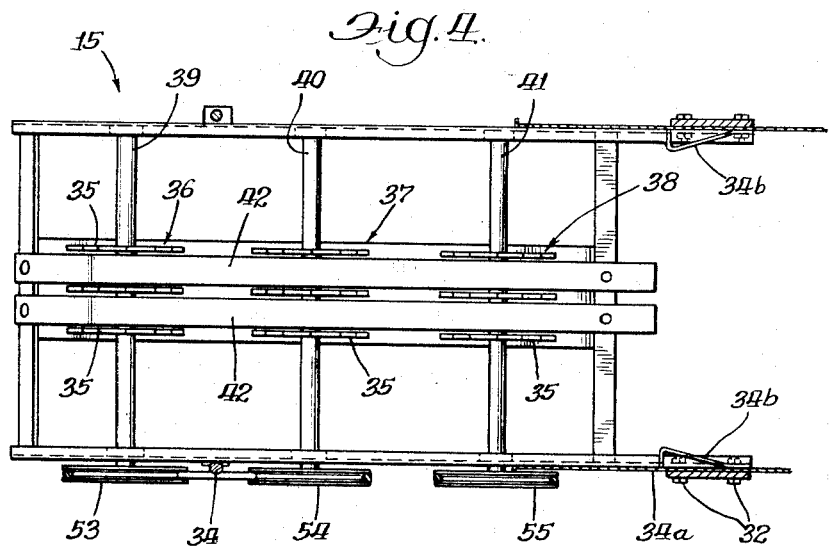
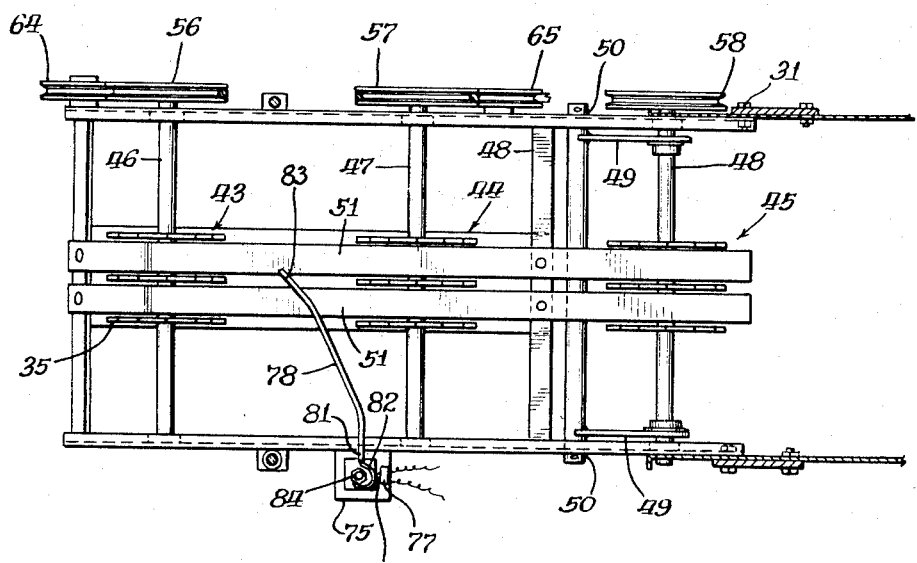

United States Patent Office 3,400,807
Patented Sept. 10, 1968

3,400,807
INTERMITTENTLY OPERATED BALE THROWER
Louis E. Nickla and John R. Majkrzak, Memphis, Tenn., assignors to International Harvester Company, Chicago, Ill., a corporation of Delaware
Filed Oct. 19, 1966, Ser. No. 587,779
14 Claims. (Cl. 198—128)

ABSTRACT OF THE DISCLOSURE

A bale thrower for trajecting a bale discharged from the baling chamber of a baler to a trailing wagon, the bale thrower comprising two sets of rotatable rollers, the sets being spaced to receive a bale therebetween. Each roller includes a plurality of axially spaced star wheels which penetratingly engage the bale thereby providing a contact surface for transmitting trajection forces to the bale. The bale thrower operates intermittently, the operation being responsive to a bale received between the sets of rollers.

---

This invention relates generally to bale throwers and more particularly to intermittently operated bale throwers.

A baler attachment for automatically handling bales as they emerge from the bale chamber offers obvious savings in the operator's time, labor and cost. A bale thrower is one of such innovations recently developed in the implement industry and operates on the principle of accelerating the emerging bale to a trajectory velocity sufficient to impel the bale to a trailing wagon. Bale throwers of divers types and descriptions have evolved in the industry. The bale thrower contemplated by the present invention belongs to the particular type which employs bale gripping devices for imparting sufficient trajectory velocity to the bale. Bale throwers of this type generally employ continuously orbiting or rotating rollers or conveyors that frictionally engage bales for applying trajectory forces to the bale. This arrangement, while taking advantage of the flywheel effect of the continuously rotating or orbiting trajectory devices, is inefficient since the ball throwing operation time is only a fraction of the total operating time. Furthermore, the frictional engagement arrangement results in considerable slippage of the trajectory means on the bale until the areal engagement of the gripping surface is sufficient to produce the required friction for transmitting forces thereto.

The continuously operated bale thrower precludes use of bale penetrating trajectory means since the penetrating member would rip the oncoming bale to shreds before attaining sufficient grip thereupon to impart the trajectory force.

The present invention presents the novel feature of an intermittently operated bale thrower having bale penetrating means for imparting trajectory velocity to the oncoming bale. The intermittent operation allows wider latitude in controlling the point at which the trajectory forces become operative, and, since the forces are operative only during bale throwing process, it is more efficient than the continuously operated bale thrower. In regards to bale thrower control, the present invention further contemplates the use of an electrical circuit which not only results in more precise control but allows the control point to be conveniently located with respect to the operator.

A principal object of the present invention is to provide a bale thrower for trajecting bales of hay as they emerge from a hay baler to a trailing wagon.

Another object is the provision of a remote control which permits the operator to control operation of the bale thrower.

A further object is to provide a bale thrower which operates only during bale throwing operation.

Still another object is the provision of bale penetrating means for imparting trajectory forces to the bales.

A still further object is to minimize the overall length of a baler-thrower combination by providing a bale thrower which receives the frontal portion of a bale before it is completely discharged from the bale chamber.

Another object is the provision of bale thrower control means conveniently positioned with respect to the operator for manually controlling the trajection distance of bales ejected from the bale thrower.

Other objects and a fuller understanding of the present invention may be had by referring to the following description and claims taken in conjunction with the accompanying drawings in which:

FIGURE 4 is a sectional view taken generally on the line IV—IV of FIGURE 1 showing the bottom trajectory frame;

FIGURE 5 is a sectional view taken generally on line V—V of FIGURE 1 showing the top trajectory frame;

Structure of the invention

Figure 1:
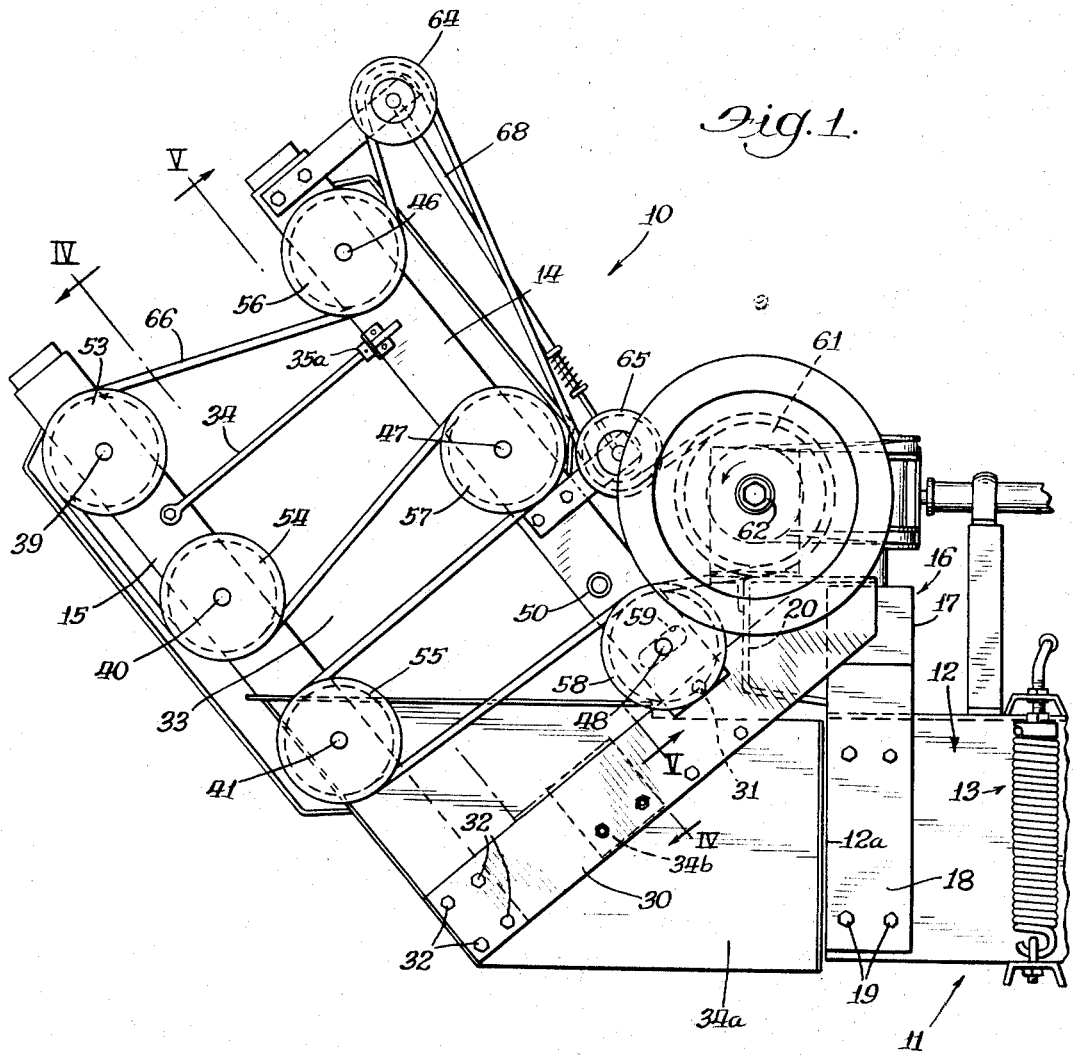
FIGURE 1 is a side elevational view of the bale thrower contemplated by the present invention mounted on the rear portion of a baler.

FIGURE 1 shows a bale thrower 10 constructed in accordance with the principles of the present invention mounted at the rear of a baler designated generally as 11. The baler 11 terminates in a bale chamber 12 having bale tensioning means 13. Since the bale chamber 12 and the bale tensioning means 13 form no part of the present invention, discussion of these parts is limited to a general description to indicate the environment in which the bale thrower 10 operates.

The bale thrower 10 comprises generally an upper trajectory frame 14 and a lower trajectory frame 15 which, respectively, carry belt driven trajectory means. The power source for propelling the trajectory means may either be a power takeoff from the tractor (not shown) pulling the baler or an independent engine (not shown). The bale thrower 10 is directed rearwardly and inclined upwardly so that the trajectory of bales discharged therefrom leads to a trailing wagon (not shown).

The bale thrower 10 is pivotally mounted on the baler 11 at a point above the bale chamber discharge 12a by means of a mounting assembly designated generally as 16.

Figure 2:
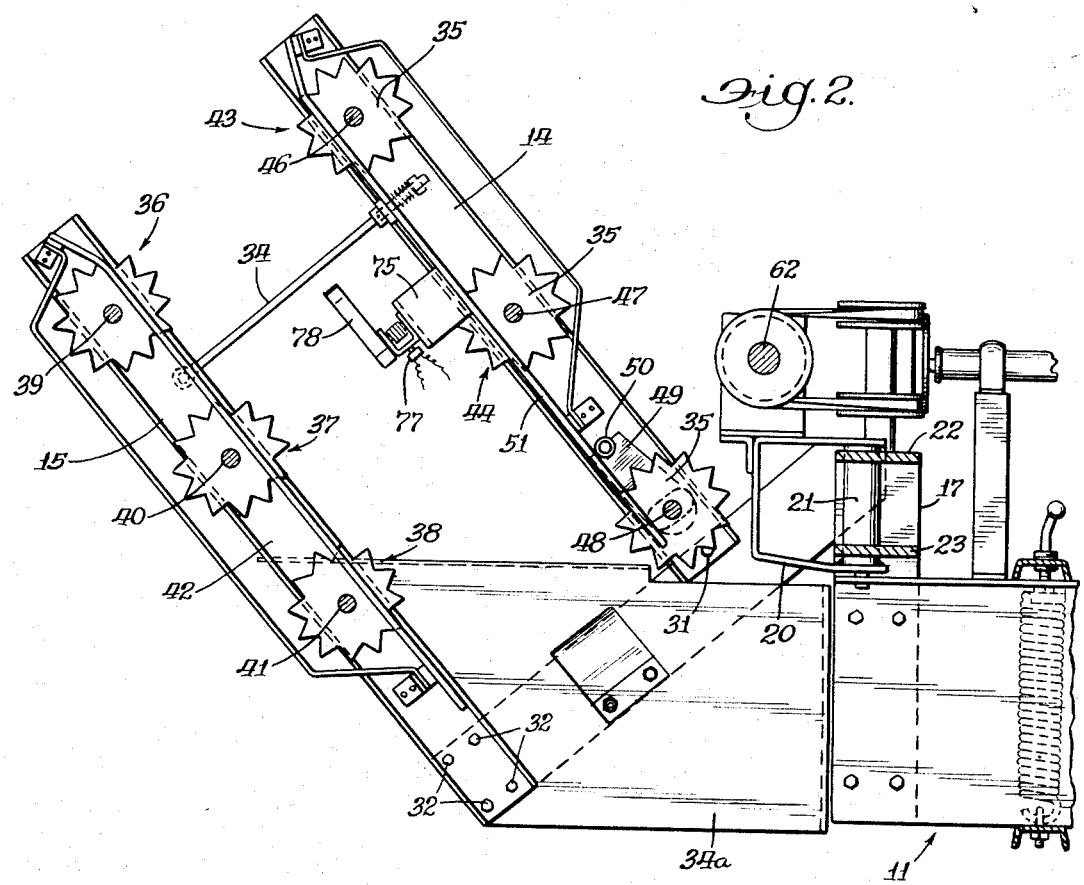
FIGURE 2 is a sectional view of the bale thrower shown in FIGURE 1.

The mounting assembly 16 includes a stationary frame 17 having a pair of depending legs 18 bolted to opposite sides of the bale chamber 12 as shown at 19, and a mounting bracket 20 hinged to the stationary frame 17. As best seen in FIGURE 2 the hinged connection is provided by a vertical mounting sleeve 21 positioned above the rear portion of the bale chamber 12 and adequately supported by cross members 22 and 23 of the stationary frame 17. The axis of the sleeve 21 constitutes the axis about which the bale thrower swings.

Figure 3:
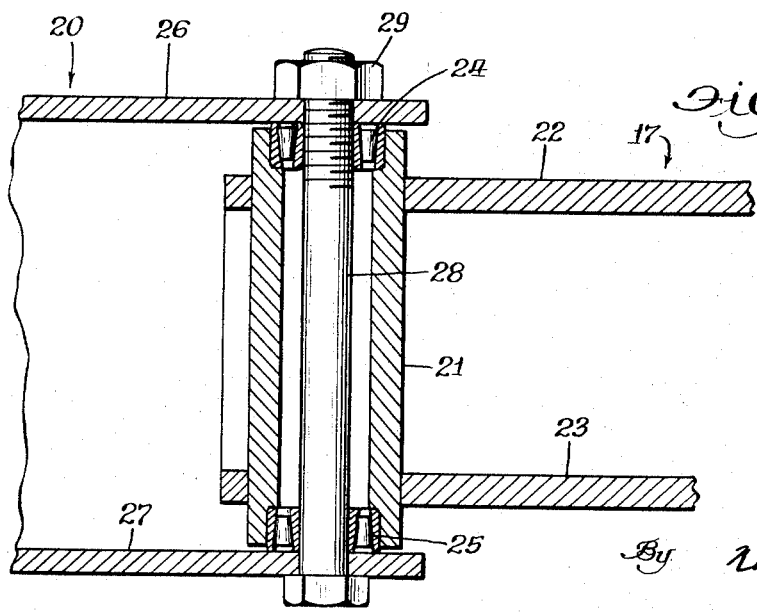
FIGURE 3 is a fragmentary sectional view showing details of the mounting structure.

As shown in FIGURE 3, the upper and lower ends of the sleeve 21 are recessed for receiving annular bearings 24 and 25 which protrude slightly beyond their respective ends of the sleeve 21 thereby forming a bearing surface for upper and lower members 26 and 27 of the mounting bracket 20. A pivot bolt 28 is concentrically mounted in the sleeve 21 and rotatable relative thereto.

The pivot bolt 28 is fixedly clamped to the bracket 20 by nut 29 so that the bracket 20 and the pivot bolt 28 pivot as a unit about the axis defined by the stationary sleeve 21.

As best seen in FIGURE 1, the mounting bracket 20 is flanked by a pair of welded depending legs 30 which slant downwardly and rearwardly. The upper trajectory frame 14 is pivotally mounted on the depending legs 30 by bolts 31 and the upper trajectory frame 15 is secured to the depending legs 30 by bolts 32. The frames 14 and 15 extend inclinedly rearwardly in a parallel relationship with respect to each other. The space between the upper and lower trajectory frames 14 and 15 constitutes a bale transfer passageway 33, the longitudinal axis of which determines the direction and angle of bale trajection.

The extended ends of the trajectory frames 14 and 15 are interconnected by lateral brace members 34 so that a parallel relationship between the frames is substantially maintained at all times. The brace members 34 are provided with clamps 35a for adjusting the distance between the upper and lower trajectory frames 14 and 15 to any desired spacing.

A trough 34a joined to the bale thrower 10 and pivotable therewith guides the bales from the bale chamber discharge 12a into the bale transfer passageway 33. Centering guides 34b disposed on the inside walls of trough 34a direct the bales to the center of the passageway 33.

The trajectory frames 14 and 15, respectively, carry bale gripping devices for applying positive forces to bales accommodated in the bale transfer passageway 33. The transfer of forces in the transfer passageway 33 accelerates the bale from an essentially standstill to a trajectory velocity sufficient to impel the bale 6 to 30 feet beyond the bale thrower discharge. The present embodiment depicts the gripping devices as being a series of star wheel rollers, each star wheel being designated by the numeral 35, but it is to be understood that the scope and spirit of this invention is broad enough to encompass any similar device which relies on positive application of forces to a bale in changing its momentum.

As shown in FIGURE 4, the star wheels 35 are mounted in sets of three, 36, 37, and 38 on three shafts 39, 40, and 41, respectively. The shafts 39, 40, and 41 are spaced transversely along the lower trajectory frame 15 and the star wheels of each of the sets 36, 37 and 38 are coaxially spaced and aligned with corresponding star wheels of the other sets. Lower guide strips 42 disposed above the shafts 39, 40, and 41 extend between the spaced apart star wheels of each set and are positioned so that a radial portion of each star wheel 35 extends above the guide strips and protrudes into the bale passageway 33.

The upper trajectory frame 14 shown in FIGURE 4 is also provided with three sets of star wheels designated generally as 43, 44, and 45 and are respectively mounted on shafts 46, 47, and 48. Sets 43 and 44, mounted on shafts 46 and 47, are journaled to the upper trajectory frame 14 and are aligned generally with corresponding sets 36 and 37 of the lower trajectory frame 15, but set 45 is floatably carried on the upper frame 14 and is offset from corresponding set 38 of the lower trajectory frame 15. The floating set of star wheels 45 is positioned less than one bale length from the bale chamber discharge 12a. Hence, a bale emerging from the bale chamber will come into contact with the floating set 45 before the bale is completely ejected from bale chamber 12. The shaft 48 which carries the floating set of star wheels 45 is journaled to pivot arms 49 which are pivoted to the upper trajectory frame as shown at 50 so that the floating characteristic of the set 45 is effected by pivotal movement about the hinged point 50.

Upper guide strips 51, disposed a short distance below the shafts 46, 47, and 48 extend longitudinally between the spaced apart star wheels 35 of each of the sets 43, 44, and 45. The star wheels 35 of each set have peripheral portions protruding into the bale passageway 33. The lower guide strips 42 and the upper guide strips 51 prevent bales accommodated in the passageway 33 from jamming between the star wheel sets and tend to prevent loose hay from wrapping around the shafts.

Figure 8:
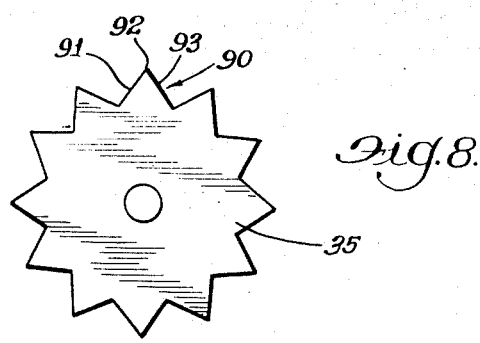
FIGURE 8 shows the details of the star wheels used in the bale thrower shown in FIGURE 1.

With reference to FIGURE 8, each star wheel 35 comprises a plurality of V-shaped teeth, each tooth designated as 90 and having a leading edge 91, a point 92, and trailing edge 93. The angle of the leading edge 91 with reference to the star wheel radius taken through the point 92 should be sufficient to provide a force transfer surface with bales accommodated in the passageway 33, but not excessively acute so as to shred the bale upon disengaging therefrom. Tests indicate that an angle of 30° provides a sufficient force transfer surface and does not result in excessive bale shredding upon discharge. Each tooth 90 forms an included angle of 60°.

The drive means for propelling the sets of star wheels comprises generally a series of pulleys driven by a double V-belt 66. As shown in FIGURES 1, 4, and 5, the shafts 39, 40, 41, 46, and 47 extend beyond one side of the bale thrower 10 and, respectively, carry pulleys 53, 54, 55, 56, and 57. Shaft 48, which carries the floating set of star wheels 45, extends through a slot 59 formed in the upper frame 14 and has keyed thereto a pulley 58. The floating assembly comprising the set of star wheels 45, shaft 48, and pulley 58 pivots about the hinge point 50.

Figure 6:
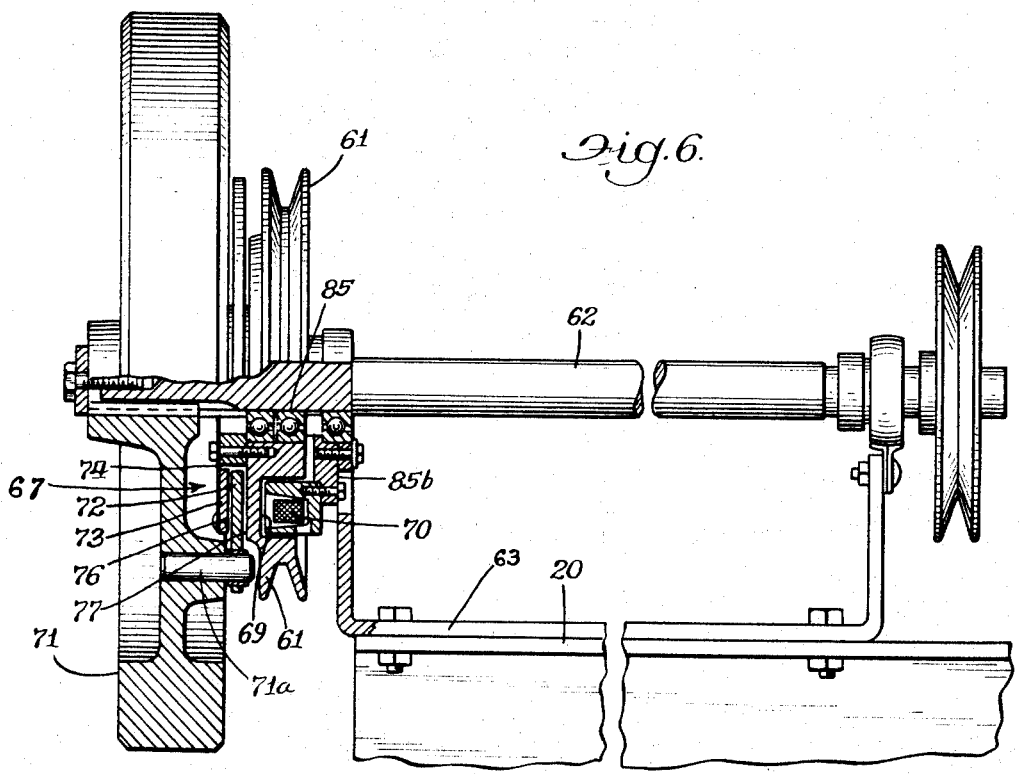
FIGURE 6 is a fragmentary sectional view of the magnetic clutch.

Referring to FIGURE 1 and FIGURE 6, a driven pulley 61 which is cooperatively arranged with the clutch means to be discussed later is mounted on a jack shaft 62. The jack shaft 62 is journaled to a bracket 63 bolted to the mounting bracket 20. Idler pulleys 64 and 65 complete the series of pulleys. A double V-belt 66 is sinuously trained over the series of pulleys whereby the rotation of the driven pulley 61 in a counterclockwise direction as indicated by the arrow in FIGURE 1 produces clockwise rotation of the upper frame pulleys 56, 57, and 58 and counterclockwise rotation of the lower frame pulleys 53, 54, and 55. Belt tension is controlled by the belt tension assembly 68 interconnecting the idler pulleys 64 and 65.

As shown in FIGURE 6, the clutch assembly includes generally the driven pulley 61 having an annular recess 69 for receiving a stationary field coil 70; a flywheel 71 keyed to the shaft 62; and a pair of disks 72 and 73 which are respectively connected to the flywheel 71 by a plurality of dowel pins 71a and the pulley 61 by a plurality of flat springs 74. The pulley 61 is journaled to the shaft 62 at 85 and the field coil 70 is mounted stationary to bearing support 85b. In the disengaged, deenergized position of the clutch, as illustrated, the shaft 62, flywheel 71, and disk 72 rotate continuously whereas the pulley 61 remains stationary. Upon energization of the stationary field coil 70, the disks 72 and 73 are attracted toward the pulley 61 creating a frictional engagement of disk 73 upon disk 72 as at 76 and a frictional engagement of disk 72 upon pulley 61 as at 77. Upon deenergization of the stationary field coil 70, the flat springs 74 return the disks 72 and 73 to their normally disengaged positions. Inasmuch as the frictional engagement of the stationary parts upon the moving part is dependent upon the magnetic force created by the stationary field coil 70, it will be appreciated that clutch slippage is a function of current flow to the stationary field coil 70.

Figure 7:
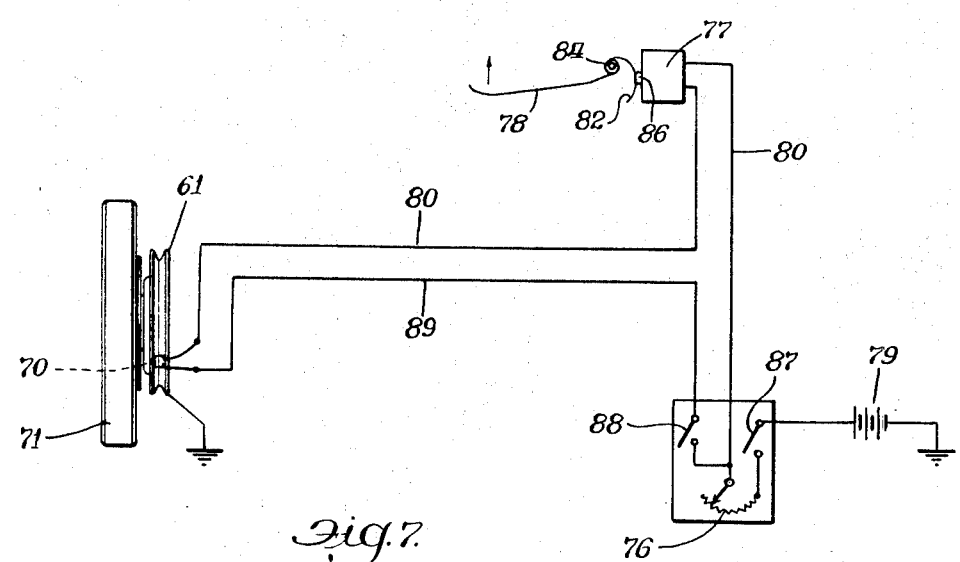
FIGURE 7 is a schematic of the electrical control system.

With reference to FIGURES 5 and 7, the control apparatus includes generally a rheostat 76, an electric switch 77, an actuator arm 78, an electric power source 79, and electrical lines 80 interconnecting the various components including the stationary field coil 70.

As best seen in FIGURE 5, the switch 77 is mounted on a bracket 75 bolted to the upper frame 14. The actuator arm 78 has one end 81 attached to an actuator spring 82 and a distended end 83 disposed in the bale passageway 33 at a point generally intermediate star wheel sets 37 and 44. The actuator spring 82 is attached to the bracket 75 at a point designated by numeral 84, and is positioned to normally depress a spring loaded button 86 of normally closed switch 77. Rearward movement of a bale in the passageway 33 engages the arm 78 and pivots it and the spring 82 about the connection point 84 allowing the normally closed switch 77 to close the circuit to the stationary field coil 70.

The rheostat 76, shown schematically in the wiring diagram (FIGURE 7), may be conveniently mounted near the operator's position. The rheostat 76 provides a manual means for adjusting the resistance in the circuit thereby controlling the current flow through the field coil 70 to control the distance of throw of the bale. Switch 87 permits the operator to easily discontinue operation when the trailing wagon is outside the trajectory scope of the bale thrower.

A manual switch 88 directly energizes the stationary field coil 70 through wire 89 bypassing the switch 77 thereby permitting continuous operation of the bale thrower 10, if desired.

*Operation of the invention*

In commencing baling operations, it is desirable to load the trailing wagon from rear to front. The rheostat 76 is initially set at minimum resistance giving the longest trajection distance. As the wagon is filled from rear to front the rheostat 76 is periodically adjusted to higher and higher resistance settings resulting in corresponding reductions in trajection distances.

As the bales of hay emerge from the bale chamber 12 they are guided into the bale thrower 10 by trough 34a. The frontal portion of the bale first contacts the floating set of star wheels 45. At this point in the operation, the bale has not been completely discharged from the bale chamber 12 since the floating set of star wheels 45 is positioned less than one bale length from the bale chamber discharge 12a. As the bale advances into the passageway 33 it is directed upwardly, forcing the floating set of star wheels 45 upwardly. A sufficient force caused by the V-belt tension opposing upward movement of the pulley 58 causes the teeth of the floating set of star wheels 45 to penetrate the top surface of the bale. The floating set of star wheels 45 is forced upwardly to the full extent of slot 59. Thus the floating set of star wheels 45 mitigates the extremity of the arcuate angle in the top surface of the bale as it is forced from a horizontal to an inclined position. The floating set of star wheels 45 also provides a desirable function of keeping the bale in alignment with the passageway 33.

The frontal portion of the bale is substantially advanced into the passageway 33 when the rear portion is finally discharged from the bale chamber 12. Further movement of the bale into the passageway 33 is caused by the succeeding bale emerging from the bale chamber 12. As the bale is pushed beyond the middle sets of star wheels, 44 and 37, the frontal portion of the bale forces the actuator arm 78 rearwardly which actuates the switch 77 energizing the circuit to the field coil 70 of the magnetic clutch 67. Engagement of the magnetic clutch 67 brings the driven pulley 61 into rotation with the continuously rotating flywheel 71, and the sets of star wheels, through the V-belt drive connection, begin rotating at trajectory speed.

Transmission of trajectory forces to the bale is initially from the rotating star wheel sets 37, 38, 44, and 45 which immediately set the bale into motion through the passageway 33. It should be noted that the transmission of trajectory forces to the bale is through a positive engagement of the star wheels upon opposite sides of the bale and not merely by a frictional engagement. It should also be noted that the action of the floating set of star wheels 45 upon the bale will tend to push the bale through the passageway 33 whereas the other sets of star wheels tend to pull the bale through the passageway 33. The combination of pushing and pulling action on the bale reduces the likelihood of bale breakage as is common in continuously operated bale throwers when the bale is not free from the bale chamber.

The final sets of star wheels 36 and 43 impart additional forces to the bale and bring the bale to trajectory velocity. The bale is discharged from the bale thrower 10 and impelled to a trailing wagon. The extent of the trajection is determined by the rate of rotation of the star wheel sets which is controlled by slippage across the magnetic clutch 67. If a short trajection is desired, the rheostat 76 is manually set at a high resistance resulting in relatively low current flow to the stationary field coil 70. The magnetic forces being low, considerable slippage will occur across the magnetic clutch 67. Consequently, the driven pulleys and star wheel pulleys will be driven at substantially less rate than the fly wheel 71. Conversely, if a long trajection is desired, the rheostat 76 is set at minimum resistance causing an increase in current and corresponding increase in magnetic force across the magnetic clutch 67 resulting in maximum bale trajection. The rheostat 76 may be calibrated at several intermediate points so that the operator can conveniently select the desired trajection length.

Frequently, it is necessary to temporarily discontinue operation of the bale thrower, e.g., when the trailing wagon is outside the trajection scope of the bale thrower. The operator merely turns the switch 87 to "off" position. Upon returning to normal conditions, the bale thrower operation is resumed by turning the switch to the "on" position.

The manual switch 88 permits the bale thrower to be operated continuously, a feature which facilitates clearing the bale thrower or prematurely ejecting bales therefrom.

What is claimed is:

1. A bale thrower for trajecting a bale discharged from a baling chamber of a baler to a delivery point, said bale thrower comprising:
   a frame mounted at the rear of said baler, said frame defining a bale passageway aligned with said baling chamber for receiving bales discharged therefrom;
   a set of rollers journally mounted on one side of said passageway and extending transversely thereacross;
   guide means mounted on said frame and positioned on a side of said passageway opposite said one side of said passageway, said rollers and said guide means being arranged to confront opposite sides of said bale accommodated in said passageway, at least one of said rollers having bale penetrating means formed in its periphery, said bale penetrating means adapted to penetratingly engage a bale accommodated in said passageway; and
   means for driving said rollers at a velocity wherein said bale penetrating means shreddingly penetrates said bale thereby transmitting trajectory forces thereto.

2. The invention as recited in claim 1 wherein said bale penetrating means includes a plurality of teeth extending radially outwardly from said roller and spaced circumferentially thereabout.

3. The invention as recited in claim 1 wherein each of said rollers include a shaft and a plurality of star wheels axially spaced along said shaft, each of said star wheels having peripheral portions extending into said passageway, said peripheral portions of each star wheel having a transverse dimension relative to said bale such to permit penetration of said bale accommodated in said passageway upon rotation of said star wheel.

4. The invention as recited in claim 1 and further comprising a second set of rollers journally mounted on said frame on a side opposite said one side, at least one of said rollers of said second set including bale penetrating means for penetratingly engaging a bale accommodated in said passageway, said drive means including means for driving said second set of rollers at a velocity wherein said bale penetrating means shreddingly penetrates said bale accommodated in said passageway thereby transmitting trajectory forces to said bale.

5. The invention as recited in claim 4 wherein said set of rollers is mounted on said frame to engage a bottom portion of said bale accommodated in said passageway and said second set of rollers is mounted on said frame to engage a top portion of said bale.

6. The invention as recited in claim 5 wherein said set of rollers total three in number spaced along said frame to engage said bottom portion of said bale at three longitudinally spaced points, and said second set of rollers total three in number spaced along said frame to engage said top portion of said bale accommodated in said passageway at three longitudinally spaced points.

7. The invention as recited in claim 6 wherein each of said rollers include a shaft and a plurality of star wheels axially spaced along said shaft, the star wheels of each roller being aligned with the star wheels of the other rollers.

8. The invention as recited in claim 7 wherein said star wheels for each roller total three in number.

9. A bale thrower for trajecting a bale discharged from a baling chamber of a baler to a delivery point, said bale thrower comprising:
a frame mounted at the rear of said baler, said frame defining a bale passageway aligned with said baling chamber for receiving bales discharged therefrom;
bale trajectory means including bale penetrating means for shreddingly penetrating a bale accommodated in said passageway thereby transmitting trajectory forces thereto;
means for driving said bale trajectory means; and
means for sensing the presence of the bale in said passageway, said drive means being operatively responsive to said sensing means so that said bale trajectory means are operated only when said bale is in said passageway.

10. A bale thrower as recited in claim 9 wherein said drive means includes:
a continuously rotating member;
a driven member;
force transmitting means interconnecting said driven member and said bale trajection means; and
a clutch interconnecting said rotating member and said driven member, said clutch being engageable to transmit torque from said rotating member to said driven member and said clutch being operatively responsive to said sensing means.

11. A bale thrower as recited in claim 10 wherein said clutch includes:
control means for selectively varying the torque capacity of said clutch so that said driven member and said bale trajection means may be driven at variable speeds.

12. A bale thrower as recited in claim 11 wherein said control means comprises an electric circuit including an electromagnet for moving said clutch to said engaged position in response to current flow in said circuit, the torque capacity of said clutch being determined by current flow in said circuit,
a rheostat for controlling current flow in said circuit thereby determining torque capacity of said clutch, and
a switch for closing and opening said circuit, said switch being responsive to said bale sensing means.

13. A bale thrower as recited in claim 12 wherein said bale sensing means includes:
a lever disposed in said passageway and movable in response to presence of said bale in said passageway;
said switch operative to close said circuit in response to movement of said lever,
whereby said bale trajection means are driven only when a bale is in said passageway.

14. A bale thrower for use with a baler having a substantially horizontal bale chamber, said bale thrower comprising:
a frame defining a bale passageway of rectangular cross section, said passageway being aligned with said bale chamber for receiving bales discharged therefrom and being inclined upwardly and rearwardly therefrom;
a plurality of driven lower rollers extending transversely across the bottom of said passageway; and
a plurality of driven upper rollers extending transversely across the top of said passageway, one of said rollers being positioned adjacent said bale chamber, the other of said rollers being positioned remotely therefrom, said adjacent roller being floatably carried by said frame and yieldably movable away from said passageway in response to movement of a bale into said passageway;
whereby distortion of the bale in moving from the substantially horizontal bale chamber into the inclined passageway is minimized.

References Cited

UNITED STATES PATENTS

| | | | |
|---|---|---|---|
| 151,253 | 5/1874 | Osborne | 198—127 |
| 475,628 | 5/1892 | Stombs | 198—127 |
| 1,093,763 | 4/1914 | Brown | 198—167 |
| 1,591,801 | 7/1926 | Anderson | 198—167 |
| 2,507,540 | 5/1950 | Nolt | 198—167 |
| 2,579,906 | 12/1951 | Cook | 29—121 |
| 3,090,477 | 5/1963 | Luek | 198—128 |
| 727,641 | 5/1903 | Knowlton | 192—84 |
| 1,289,169 | 12/1918 | Henderson | 198—7 |
| 3,181,670 | 5/1965 | Leive | 192—84 |
| 3,191,755 | 6/1965 | Timberlake | 198—128 |
| 3,326,352 | 6/1967 | Heinlein | 198—160 |

RICHARD E. AEGERTER, *Primary Examiner.*